United States Patent [19]

Guillaume et al.

[11] Patent Number: 4,636,639

[45] Date of Patent: Jan. 13, 1987

[54] DEVICE FOR THE OPTICAL MEASUREMENT OF THE EDGE TO EDGE DIMENSION OF AN OBJECT

[76] Inventors: Michel E. Guillaume, Les Bletieres-Les Adrets, 38190 Brignoud; Nicole Noailly, 61 Bd J. Vallier, 38100 Grenoble, both of France

[21] Appl. No.: 634,542

[22] Filed: Jul. 26, 1984

[30] Foreign Application Priority Data

Jul. 26, 1983 [FR] France ................................ 83 12328

[51] Int. Cl.$^4$ ........................ G01B 11/02; G01B 11/08
[52] U.S. Cl. ...................................... 250/560; 356/384
[58] Field of Search .............................. 250/560–561, 250/571, 550, 574, 222.1; 356/335–336, 381–384, 387

[56] References Cited

U.S. PATENT DOCUMENTS 3,937,580 2/1976 Kasdan .............................. 356/384
4,263,508 4/1981 Leary et al. ........................ 356/335

OTHER PUBLICATIONS

IBM Technical Disclosure Bulletin, vol. 20, No. 1, Jun. 1977, New York; R. S. Charsky et al.

Primary Examiner—Edward P. Westin
Attorney, Agent, or Firm—Oblon, Fisher, Spivak, McClelland & Maier

[57] ABSTRACT

Optical device forms a magnified image of the object to be measured. A photosensitive member constituted by a sequence of photosensitive elements is arranged in the image plane. An analog-digital converter is connected to the photosensitive member and a digital processing circuit performs a discrete Fourier transformation and determines the value N of the first minimum of the spectrum obtained or the mean variation N between minima. The sought dimension L of the object to be measured is obtained by the relation $L = X/N$, in which X is a parameter defined by the operating conditions.

3 Claims, 12 Drawing Figures

DEVICE FOR THE OPTICAL MEASUREMENT OF THE EDGE TO EDGE DIMENSION OF AN OBJECT

BACKGROUND OF THE INVENTION

The present invention relates to a device for the optical measurement of the edge to edge or side to side dimension of an object. This dimension can be a thickness, width, diameter, etc. The invention more particularly applies to small objects, for example of a few microns or less.

Inter alia, the invention can apply to the measurement of the width of a pattern deposited or etched on a flat substrate. More particularly, the invention can be used for the precise, correct measurement of a width of a line deposited on a semiconductor substrate. This line can be used as a test pattern for checking and regulating the production process of an integrated circuit. The invention makes it possible to measure sufficiently small patterns for it to be used in the production of micron and even submicron integrated circuits.

Devices exist for measuring the dimensions of objects measured in a few microns. These devices operate on the basis of the principle of a microscope-type optical system, in which a magnified image of the object is formed. An operator directly performs the measurement on the basis of this image. However, this measurement is imprecise, because the contours of the object are poorly defined and the operator must subjectively evaluate the position of these contours. Thus, the measurement varies among individual operators.

There are also devices using photosensitive elements (e.g., video cameras) placed in the plane of the magnified image of the object. These photosensitive elements supply electrical signals which can be automatically interpreted with a view to supplying a measurement of the object.

Although these devices are more accurate than those previously described, because they do not involve human evaluation, which is a source of risks and problems, their accuracy still remains mediocre. Thus, as the contours of the image are poorly defined, it is not possible to accurately know what the photosensitive device is measuring. Careful calibration only makes it possible to obtain satisfactory results if the objects have a size exceeding two microns.

In order to improve the accuracy and correctness of the measurements in the micron range, the existing tendency is to improve optical means in order to increase their quality (elimination of aberrations of all types). Thus, as the optical image is of a better quality, its interpretation is facilitated.

SUMMARY OF THE INVENTION

The present invention relates to a group of means constituting a novel optical dimension measuring device making it possible to improve both the accuracy and the correctness of the measurement for measured objects which are as small as (and even smaller than) those which can be presently measured. Moreover, this result is obtained with optical and electronic means of a conventional quality.

According to the invention, this object is achieved by using means making it possible to pass from the spatial range, which is that of the image of the object to be measured, to a frequency range obtained by discrete Fourier transforms. The measurement of the dimension than takes place in the transformed range, which leads to numerous advantages, as will be made obvious hereinafter.

The discrete Fourier transformation of a signal is naturally a per se known operation, which is already used for numerous purposes. In this connection, reference can, e.g., be made to the work of J. Lifermann entitled: "Fast methods for transforming signals: Fourier, Walsh, Hadamard, Haar", Masson 1979, chapter III.

More specifically, the present invention relates to a device for measuring the edge to edge dimension of an object. The device incorporates optical means forming a magnified image of the object in an image plane. The image clearly and distinctly shows the two edges of the object. A photosensitive member constituted by a sequence of photosensitive elements is arranged in the image plane and is oriented in a direction perpendicular to the edges of the image. The photosensitive member supplies a series of analog electrical signals having an amplitude which is a function of the light intensity received by each of the various elements constituting the photosensitive member. The device also comprises an analog-digital converter having an input connected to the photosensitive member and an output supplying a series of digital signals. A digital processing circuit is connected to the output of the converter and performs a discrete Fourier transformation of the signal formed by the series of digital signals. The transformation leads to a distribution of Fourier components comprising minima spaced by N, the first minimum also having the value. N. The processing circuit is able to determine the value N and to deduce from the value N the sought dimension L by the relation $L = X/N$, in which X is a parameter defined by the operating conditions.

In a first variant, the processing circuit determines the position of the first minimum which supplies the value N. This variant corresponds to simple cases where the images are contrasted, which is the case with measurements performed on masks. In a second variant, the processing circuit determines the mean value of the variation between the successive minima encountered in the spectrum. This variant corresponds to measurements performed on images which are greatly affected by optical interference (patterns etched on plates).

BRIEF DESCRIPTION OF THE DRAWINGS

The invention is described in greater detail hereinafter relative to non-limitative embodiments and with reference to the attached drawings.

DETAILED DESCRIPTION OF THE PREFERRED EMBODIMENTS

Figure 1:
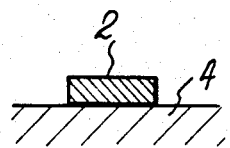
FIG. 1 is a sectional view of a theoretical pattern encountered in microelectronics.
Figure 2:
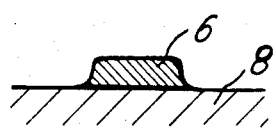
FIG. 2 is a sectional view of a real pattern.
Figure 3:
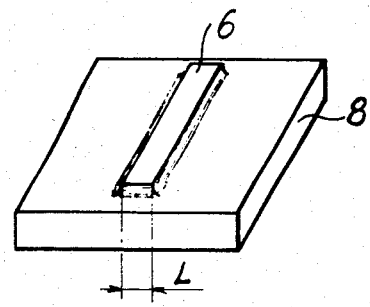
FIG. 3 is a perspective view of the pattern of FIG. 2.
Figure 4:
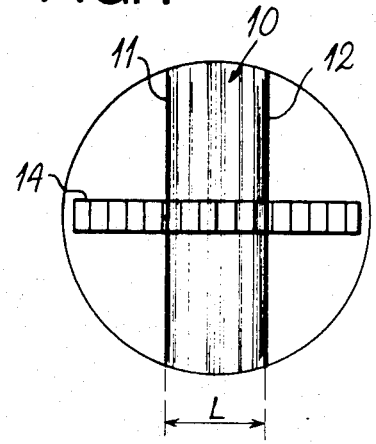
FIG. 4 is the image of the object of FIGS. 2 and 3 obtained with an optical microscope.

The object shown in FIG. 1 is a theoretical object, formed by a pattern 2 (e.g., a metallic, insulating, or semiconducting coating) which is perfectly parallelepipedic and placed on a substrate 4 (e.g., made from an insulating or semi-conducting material). In practice, such objects have a shape like that shown in FIGS. 2 and 3. The object 6 deposited on the substrate 8 has rounded edges and, examined under the microscope, gives an image 10 with poorly defined edges 11 and 12 (FIG. 4). This imprecision is due to the geometrical complexity of the real edges of the object 6 and to the imperfection of the microscope optics.

Figure 5:
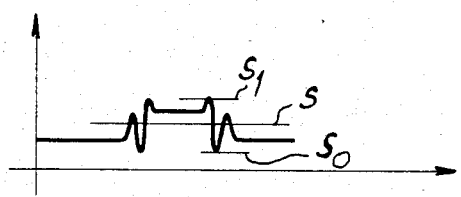
FIGS. 5 and 6 are two graphs which can be encountered during the analysis of two different patterns.
Figure 6:
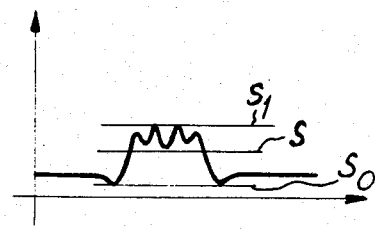

On arranging across the image 10 (i.e., in a direction perpendicular to the edges of the image) a photosensitive member 14, formed by a strip of photosensitive elements, and on sequentially extracting the signals from each of these elements, an analog signal is obtained the envelope of which has a shape like those shown in FIGS. 5 and 6. It is obvious that it is difficult to exploit such graphs in order to extract the width of the object therefrom. The signal is disturbed by diffraction, geometrical abberation, and chromatic effects, as well as by various parasitic electronic effects of the acquisition system, all of which lead to the complexity of the graphs obtained. However, in order to be able to exploit them at all, the standard measuring principle consists of experimentally choosing a threshold S between the minimum level $S_0$ and the maximum level $S_1$ of the electrical signal and measuring the width of the signal at that threshold.

It is immediately apparent that it is difficult to know precisely what is being measured in this way, even if repetitive, accurate results are obtained. Moreover, in the case of transparent objects (as is sometimes the case in microelectronics), the image obtained has a poor contrast and has interference effects which makes the measurement even more difficult.

Figure 7:
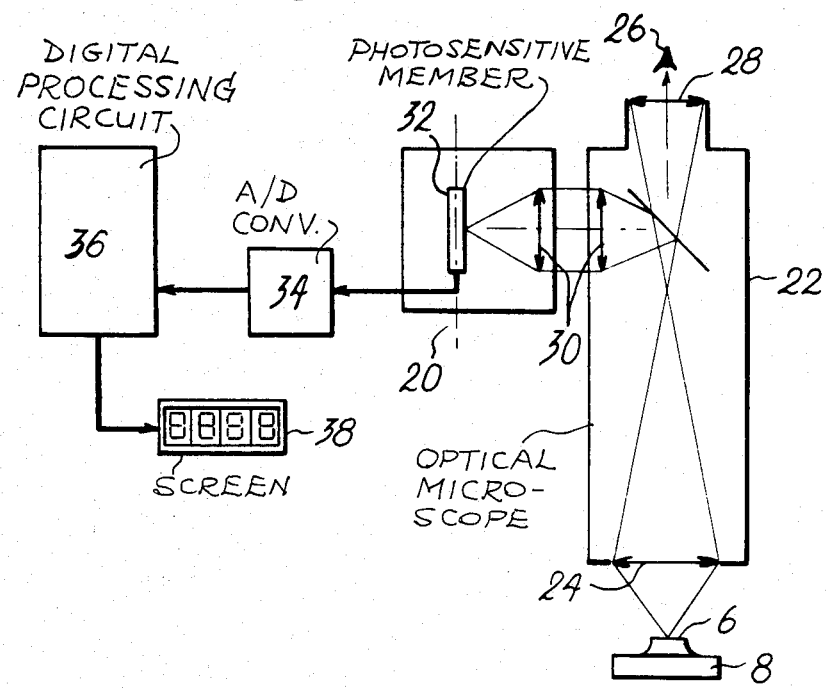
FIG. 7 is a diagram of the device according to the invention.

The invention obviates these disadvantages by an arrangement like that illustrated in FIG. 7. The represented device firstly comprises conventional optical means making it possible to form an image of the object 6 in an image plane 20. These means incorporate an optical microscope 22 constituted by a first lens 24 making it possible to obtain a magnified real image. The magnified real image can be directly observed at 26 in front of an eyepiece 28. Lenses 30 make it possible to magnify the image of the object 6 in the image plane 20. A photosensitive member 32 is provided perpendicularly to the general direction of the line in the image plane 20. The photosensitive member 32 is constituted by a group of aligned and juxtaposed photosensitive elements. To this end it is possible to use photoconductor elements associated with a charge coupled device.

According to the invention, the device also comprises an analog-digital converter 34 which converts the analog signals from the photosensitive elements in the photosensitive member 32 into digital signals. The digital signals are transmitted to a digital processing circuit 36. The digital processing circuit 36 is known per se and makes it possible to perform a discrete Fourier transform operation (the discrete characteristic of this transform being due to the fact that the signal to be transformed is sampled rather than being continuous).

Figure 8:
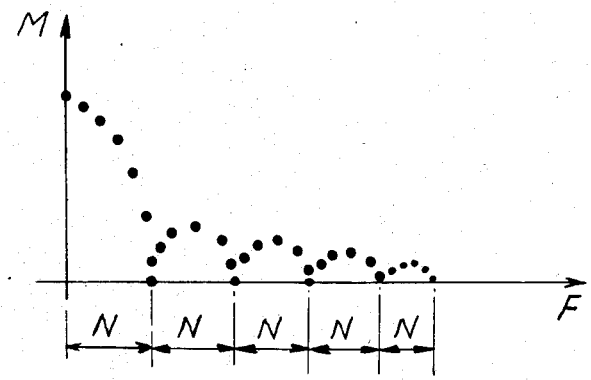
FIG. 8 is a discrete spectrum (discrete Fourier transform module) of the signal corresponding to the graphs of FIGS. 5 or 6.

The signal supplied by the discrete Fourier transform circuit is represented in FIG. 8. It consists of a succession of dots, or points, whose ordinate M corresponds to the module of the complex function resulting from the Fourier transformation. The frequency F plotted on the abscissa is naturally a spatial frequency. In accordance with the known properties of Fourier transformations, the spectrum obtained contains a sequence of minima. The function of the processing circuit 36 is also to seek the position of the first minimum or the mean value of the variations between the minima. That position or value is designated N. As is well known in the Fourier transform field, the width L of the image (i.e., of the object 6) and the value N are related by the formula $L=X/N$, in which X is a parameter defined by the operating conditions. A calibration of the device, performed with the aid of an object having a known width, makes it possible to allocate a value X to that part of the photosensitive device which forms the electrical acquisition of the image. The final result of the measurement is displayed on a screen 38.

Figure 9A:
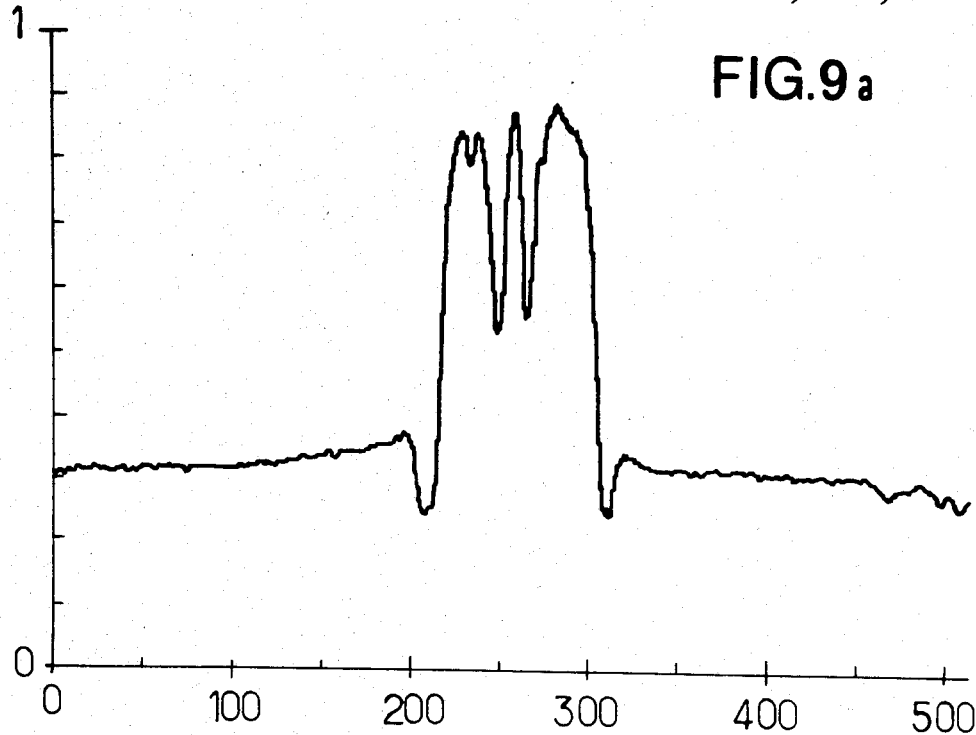
FIGS. 9a and 9b are two experimental examples of graphs for measuring the dimensions of an object.
Figure 9B:
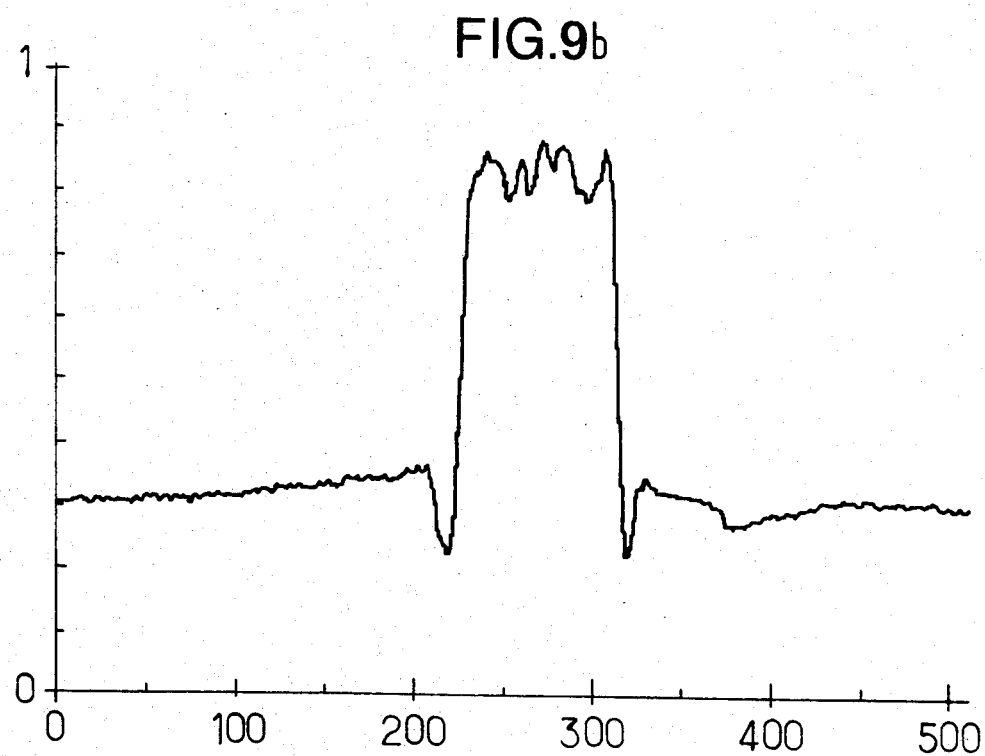

The graphs of FIGS. 9a and 9b show two examples of experimental plots of the analog signal available at the output of the photosensitive member 32. These two graphs correspond to the same object, but the analysis conditions differ. It can be seen that these two graphs are significantly different.

Figure 10A:
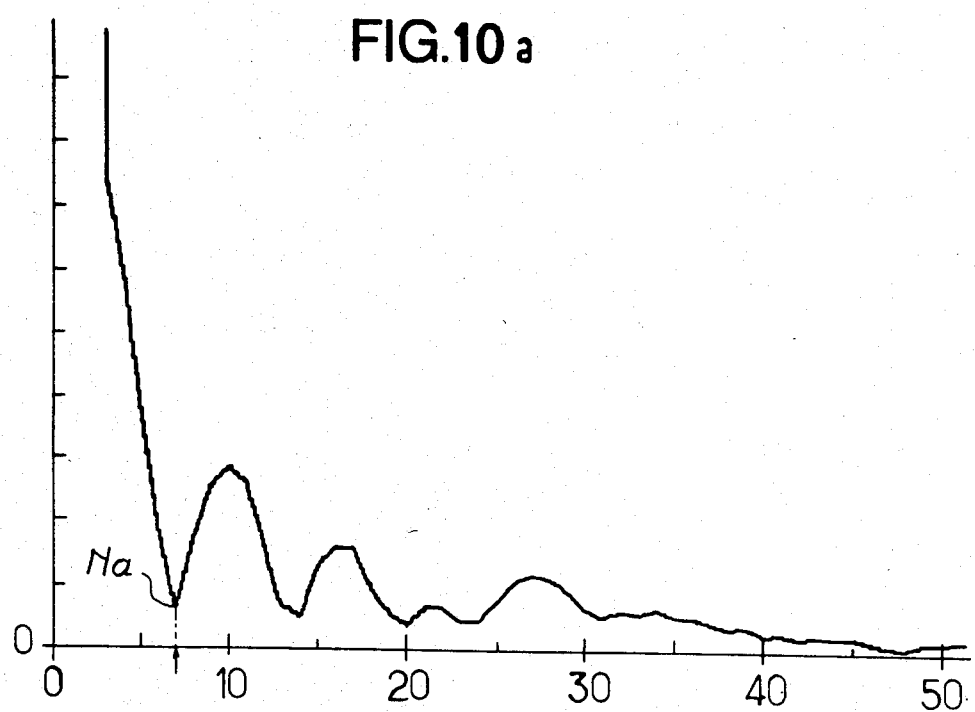
FIGS. 10a and 10b are the two discrete Fourier transforms corresponding to the two graphs of FIGS. 9a and 9b.
Figure 10B:
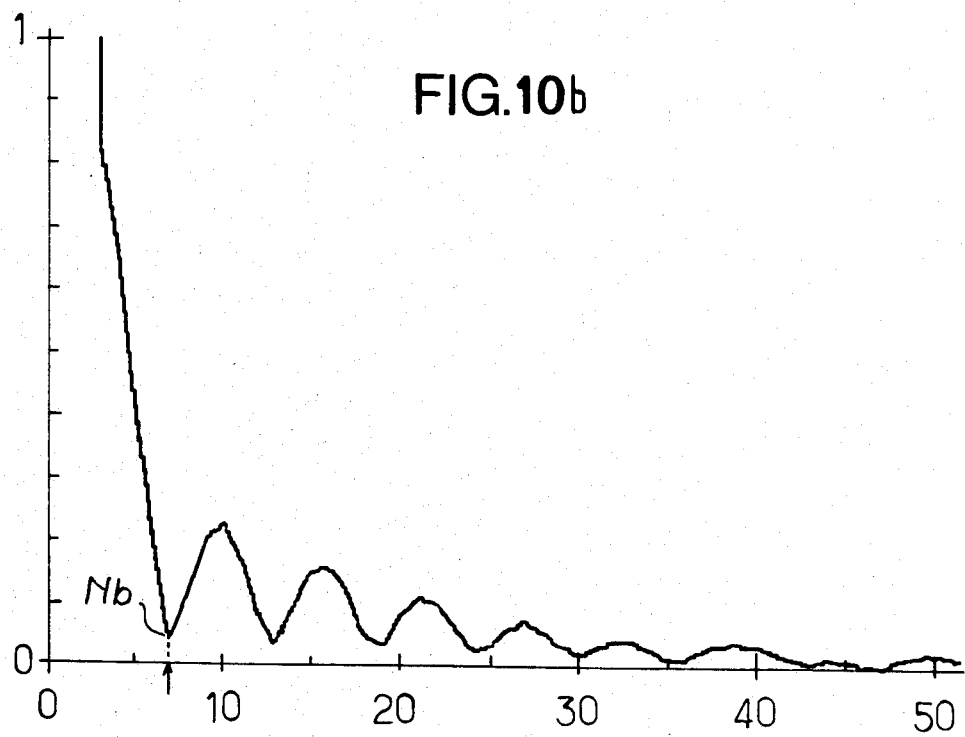

FIGS. 10a and 10b represent the Fourier transforms corresponding to the two profiles 9a and 9b. It can be seen that the two values Na and Nb, marking the position of the first minima, are identical for both cases. Thus, a large-scale independence of the operating conditions has been obtained.

What is claimed is:

1. A device for measuring an edge to edge dimension of an object, said device incorporating optical means forming a magnified image of the object in an image plane, the image clearly and distinctly showing the two edges of the object, a photosensitive member constituted by a sequence of photosensitive elements arranged in the image plane and oriented in a direction perpendicular to the edges of the image, said photosensitive member supplying a series of analog electrical signals having an amplitude which is a function of the light intensity received by each of the various elements constituting said photosensitive member, said device also comprising an analog-digital converter having an input connected to said photosensitive member and an output supplying a series of digital signals and a digital processing circuit connected to the output of said analog-digital converter and performing a discrete Fourier transformation of the signal formed by the series of digital signals, the transformation leading to a distribution of Fourier components comprising a first minimum having a value N and successive minima spaced from each other by the value N, said processing circuit being able to determine the value N and deduce from the value N the sought dimension L by the relation $L=X/N$, in which X is a parameter defined by calibration.

2. A device according to claim 1, wherein said processing circuit determines the value N of the first minimum.

3. A device according to claim 1, wherein said processing circuit determines the mean value N between successive minima.

* * * * *